(12) United States Patent
Uehara

(10) Patent No.: US 7,080,239 B2
(45) Date of Patent: Jul. 18, 2006

(54) LOOP CONTROL CIRCUIT AND LOOP CONTROL METHOD

(75) Inventor: Teruaki Uehara, Hachiouji (JP)

(73) Assignee: Oki Electric Industry, Co., Ltd., Tokyo (JP)

( * ) Notice: Subject to any disclaimer, the term of this patent is extended or adjusted under 35 U.S.C. 154(b) by 553 days.

(21) Appl. No.: 10/283,310

(22) Filed: Oct. 30, 2002

(65) Prior Publication Data
US 2004/0003219 A1 Jan. 1, 2004

(30) Foreign Application Priority Data
Jun. 26, 2002 (JP) ............................. 2002-186156

(51) Int. Cl.
G06F 9/44 (2006.01)
G06F 9/54 (2006.01)
G06F 9/40 (2006.01)

(52) U.S. Cl. ..................................... 712/241; 712/202
(58) Field of Classification Search ................ 712/202, 712/241
See application file for complete search history.

(56) References Cited
U.S. PATENT DOCUMENTS
4,652,997 A * 3/1987 Kloker ....................... 712/241
5,375,238 A * 12/1994 Ooi ............................. 712/241
6,671,799 B1 * 12/2003 Parthasarathy .............. 712/241
6,687,813 B1 * 2/2004 Norman et al. ............. 712/241

FOREIGN PATENT DOCUMENTS
JP 06-348491 12/1994
JP 09-069046 3/1997

* cited by examiner

Primary Examiner—Daniel H. Pan
(74) Attorney, Agent, or Firm—Rabin & Berdo, P.C.

(57) ABSTRACT

A loop control circuit and a loop control method that allow control on multiplexed loop operations to be executed with less overhead are provided. A loop control circuit comprises a means for address storage that stores in memory the address of a loop instruction at a second or subsequent stage in multiplexed loops or the address of the instruction immediately preceding the loop instruction when the loop instruction is executed for the first time, a means for loop instruction recurrence prediction that predicts a recurrence of the loop instruction at the second or subsequent stage by comparing the address of the loop instruction or the address of the instruction immediately preceding the loop instruction stored in memory with a value at a program counter and a means for loop instruction skipping that skips the loop instruction if it is predicted that the loop instruction is to occur next.

8 Claims, 11 Drawing Sheets

FIG.2

PROGRAM EXAMPLE 1:

```
                INSTRUCTION 0
                LOOP INSTRUCTION (1)  100,LOOP 1
                INSTRUCTION 1
                INSTRUCTION 2
                LOOP INSTRUCTION (2)  2,LOOP 2
                   INSTRUCTION 3
Loop2:             INSTRUCTION 4
Loop1:             INSTRUCTION 5
```

FIG.6

PROGRAM EXAMPLE 2:

```
              INSTRUCTION 0
              LOOP INSTRUCTION (1)  100,LOOP 1
              INSTRUCTION 1
              INSTRUCTION 2
              LOOP INSTRUCTION (2)  2,LOOP 2
                  INSTRUCTION 3
Loop2:            INSTRUCTION 4
              LOOP INSTRUCTION (3)  3,LOOP 3
                  INSTRUCTION 5
Loop3:            INSTRUCTION 6
Loop1:            INSTRUCTION 7
```

FIG.10

PROGRAM EXAMPLE 3:

```
                    LOOP INSTRUCTION (1)  100,LOOP 1
                    INSTRUCTION 1
                    INSTRUCTION 2
                    LOOP INSTRUCTION (2)  2,LOOP 2
                       INSTRUCTION 3
Loop2:                 INSTRUCTION 4
Loop1:              INSTRUCTION 5
```

LOOP CONTROL CIRCUIT AND LOOP CONTROL METHOD

BACKGROUND OF THE INVENTION

1. Field of Invention

The present invention relates to a loop control circuit and a loop control method and more specifically, it relates to a loop control circuit that executes control of multiplexed loops with a minimum of overhead and a loop control method adopted therein.

2. Description of the Related Art

In processors such as DSPs (digital signal processors), loop instructions are used to execute a specific processing repeatedly.

The following is an explanation of a loop control method in the related art, given in reference to the drawings. FIG. 8 is a block circuit diagram that illustrates the operation of a loop control circuit in the related art. The number of stages in the stacks represents the number of multiplex loop levels in the hierarchy that can be achieved in this loop control apparatus. The circuit shown in FIG. 8 supports three loops. The term "stack" used in this context refers to an LIFO (last-in, first-out) memory. In the following explanation, recording data into a stack is referred to as "pushing down" and extracting data from the stack is referred to as "popping up". In the loop control circuit in FIG. 8, the following three types of processing (phase S1) are concurrently executed in response to a loop instruction, as shown in the flowchart presented in FIG. 9.

The loop leading address corresponding to the next instruction following the loop instruction is pushed down into a "loop leading address" stack 4.

The value indicating the number of loop executions written in the loop instruction is pushed down into a "loop number" stack 5.

The loop trailing address written in the loop instruction is pushed down into a "loop trailing address" stack 6.

Then the loop control operation is executed as described below. "PC" in this context refers to a "program counter". The PC is a memory that holds the value indicating the address of the next instruction.

First, in phase S2, the PC value and the stack value at the "loop trailing address" stack 6 are compared with each other (phase S2). If the PC value is equal to the stack value at the loop trailing address stack 6, the PC value is designated as the stack value at the loop leading address stack 4 (phase S3), and in phase S4, "1" is subtracted from the stack value at the loop number stack 5 (phase S4). If, on the other hand, it is decided in phase S2 that the PC value is not equal to the stack value at the loop trailing address stack 6, the loop control operation ends.

Next, in phase S5, the stack value at the loop number stack 5 is compared against "0" (phase S5). If the stack value at the loop number stack 5 is 0, the loop leading address stack 4, the loop number stack 5 and the loop trailing address stack 6 are popped up in phase S6 (phase S6). Then, the loop control operation ends.

If it is determined that the PC value is not equal to the stack value at the loop trailing address stack 6 in phase S2, "1" is added to the value at the phase program counter 1 (phase S7), before the loop control operation ends and the data processing shifts to execute the instruction at the next address.

Through this sequence of operations, the loop control apparatus executes the loop operation by using three types of information, i.e., the loop leading address, the value indicating the number of loop executions and the loop trailing address, set in the stacks in response to the loop instruction.

FIG. 10 presents an example of a loop instruction program. The instruction "loop instruction (1) 100, Loop 1" in FIG. 10 indicates that the execution of instruction 1~5 is repeated 100 times. Likewise, the instruction "loop instruction (2) 2, Loop 2" indicates that the execution of instruction 3 and 4 is repeated twice. An instance of another loop instruction, i.e., the loop instruction (2) (an inner loop instruction) being present within the loop of the loop instruction (1) (an outer loop instruction) as shown in FIG. 10 is referred to as multiplexed loops. FIG. 11 shows the procedure through which instructions are processed when the program shown in FIG. 10 is executed. As shown in FIG. 11, by executing the program in FIG. 10, the instructions are processed in the order of; loop instruction (1)→instruction 1→instruction 2→loop instruction (2)→instruction 3→instruction 4→instruction 3→instruction 4→instruction 5→instruction 1→instruction 2→loop instruction (2)→ . . . →instruction 5. Through the program in FIG. 10, the processing of instruction 1 through 5 is repeatedly executed 100 times.

However, when executing multiplexed loop instructions in the loop control method in the related art, it is necessary to execute the inner loop instruction as many times as the number of times the outer loop instruction is executed. In FIG. 11, the loop instruction (2) 900 is repeatedly executed over 100 times. In reality, the loop instruction (2) simply instructs that the execution of instruction 3 and instruction 4 be repeated twice, and no actual data processing is executed. For this reason, there is a problem in that the presence of an inner loop instruction is bound to increase the overhead to lower the efficiency with which the overall program is processed.

SUMMARY OF THE INVENTION

An object of the present invention is to provide an loop control circuit that executes control on a multiplexed loops with a minimum of overhead and loop control method adopted therein.

In order to achieve the object described above, the loop control circuit according to the present invention comprises a means for address storage that stores in memory the address of a loop instruction at a second stage or a subsequent stage in multiplexed loops or the address of the instruction immediately preceding the loop instruction when the loop instruction is initially executed, a means for loop instruction recurrence prediction that predicts a recurrence of the loop instruction at the second stage or subsequent stage by comparing the address of the loop instruction or the address of the instruction immediately preceding the loop instruction that is stored in memory with a value at a program counter and a means for loop instruction skipping that skips the loop instruction if it is predicted that the loop instruction is to occur next.

In addition, in order to achieve the object described above, the loop control method according to the present invention comprises a phase in which the address of a loop instruction at a second stage or a subsequent stage in multiplexed loops or the address of the instruction immediately preceding the loop instruction is stored in memory when the loop instruction is initially executed, a phase in which a recurrence of the loop instruction at the second stage or the subsequent stage is predicted by comparing the address of the loop instruction or the address of the instruction immediately preceding the loop instruction that is stored in memory with a value at a program counter and a phase in which the loop instruction is skipped if it is predicted that the loop instruction is to occur next.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments.

FIG. 2 presents multiplexed loop program example 1;

FIG. 6 presents multiplexed loop program example 2;

FIG. 10 presents multiplexed loop program example 3; and

DETAILED DESCRIPTION OF THE PREFERRED EMBODIMENTS

Figure 1:
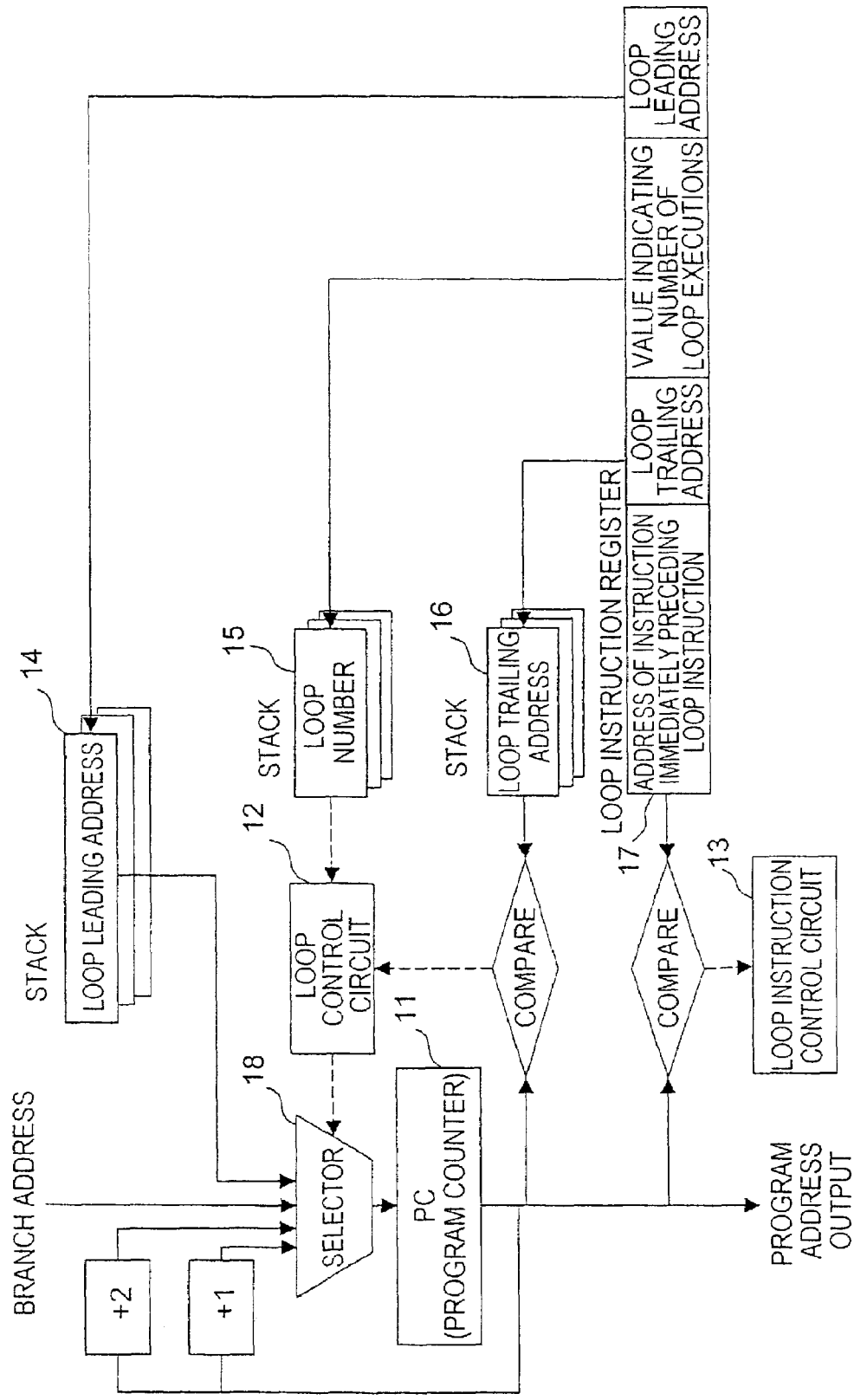
FIG. 1 is a block circuit diagram of the loop control circuit achieved in a first embodiment.

The following is an explanation of the embodiments of the present invention, given in reference to the drawings. It is to be noted that the same reference numerals are assigned to elements with identical functions in all figures provided to facilitate the explanation of the embodiments of the present invention, to preclude the necessity for a repeated explanation thereof.

(First Embodiment)

FIG. 1 is a block circuit diagram of the loop control circuit achieved in the first embodiment of the present invention. The loop control circuit in the first embodiment engages in operation as described below.

First, when executing a loop instruction, the "loop leading address" indicated in the loop instruction is pushed down into a "loop leading address" stack 14, the value indicating the number of loop executions is pushed down into a "loop number" stack 15 and the "loop trailing address" is pushed down into a "loop trailing address" stack 16.

Then, the "address of the instruction immediately preceding the loop instruction", the loop leading address, the value indicating the number of loop executions and the loop trailing address are stored into their respective storage locations in a loop instruction register 17.

Next, a loop instruction control circuit 13 compares the address of the instruction immediately preceding the loop instruction stored in the loop instruction register 17 against a "PC value" at a PC 11, and if the values are equal to each other, the loop instruction control circuit 13 concurrently executes the following four operations.

Set the PC value to a value for bypassing the loop instruction.

Push down the loop leading address stored in the loop instruction register 17 into the loop leading address stack 14.

Push down the value indicating the number of loops stored in the loop instruction register 17, into the loop number stack 15.

Push down the loop trailing address stored in the loop instruction register 17 into the loop trailing address stack 16.

It is to be noted that the value which is added to the PC value to set it to a value for bypassing the loop instruction is determined in correspondence to the number of words in the loop instruction, e.g., +2 if there are two words and +3 if there are three words. 2 is added to the PC value in the embodiment.

Figure 9:
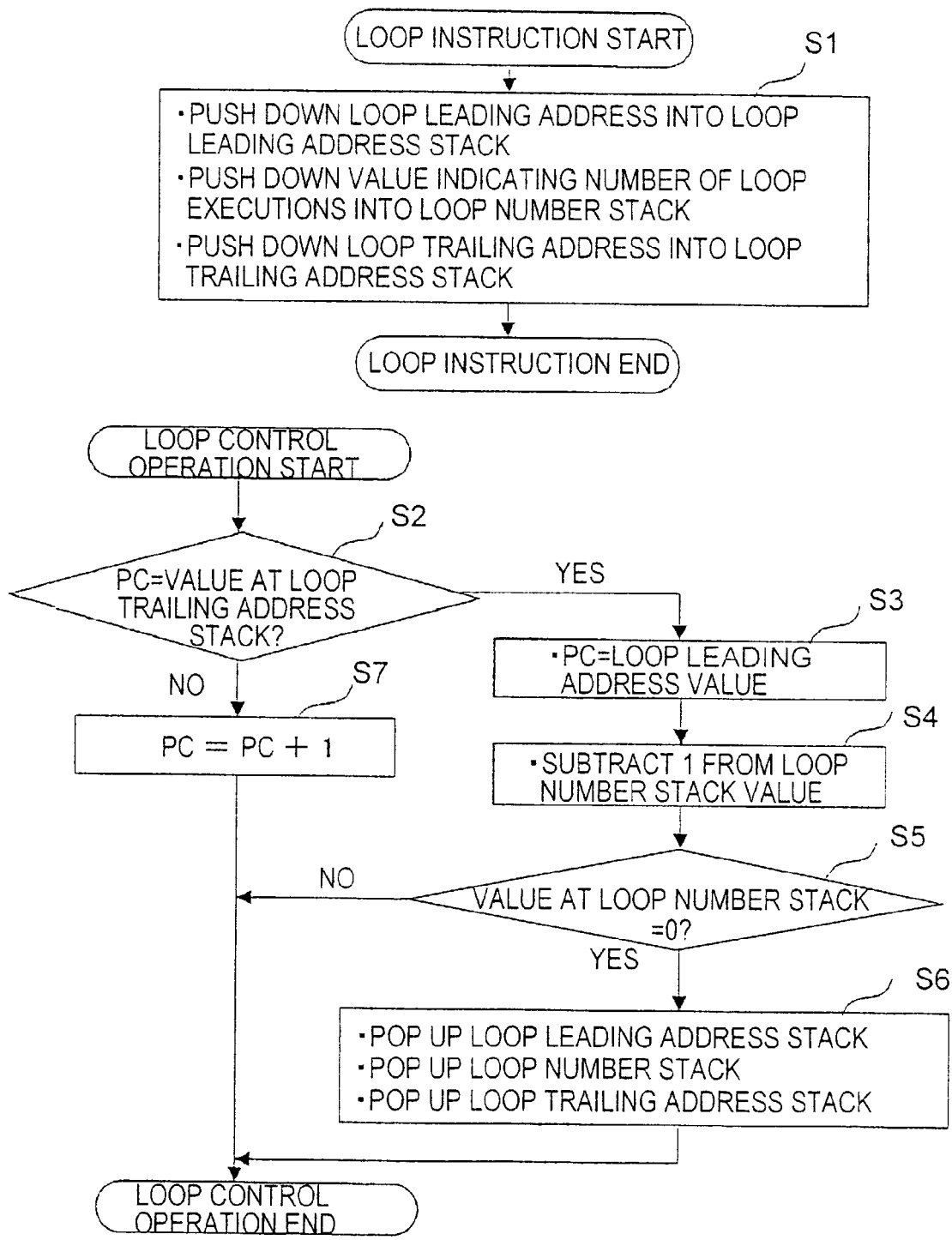
FIG. 9 presents a flowchart of standard loop processing.
Figure 11:
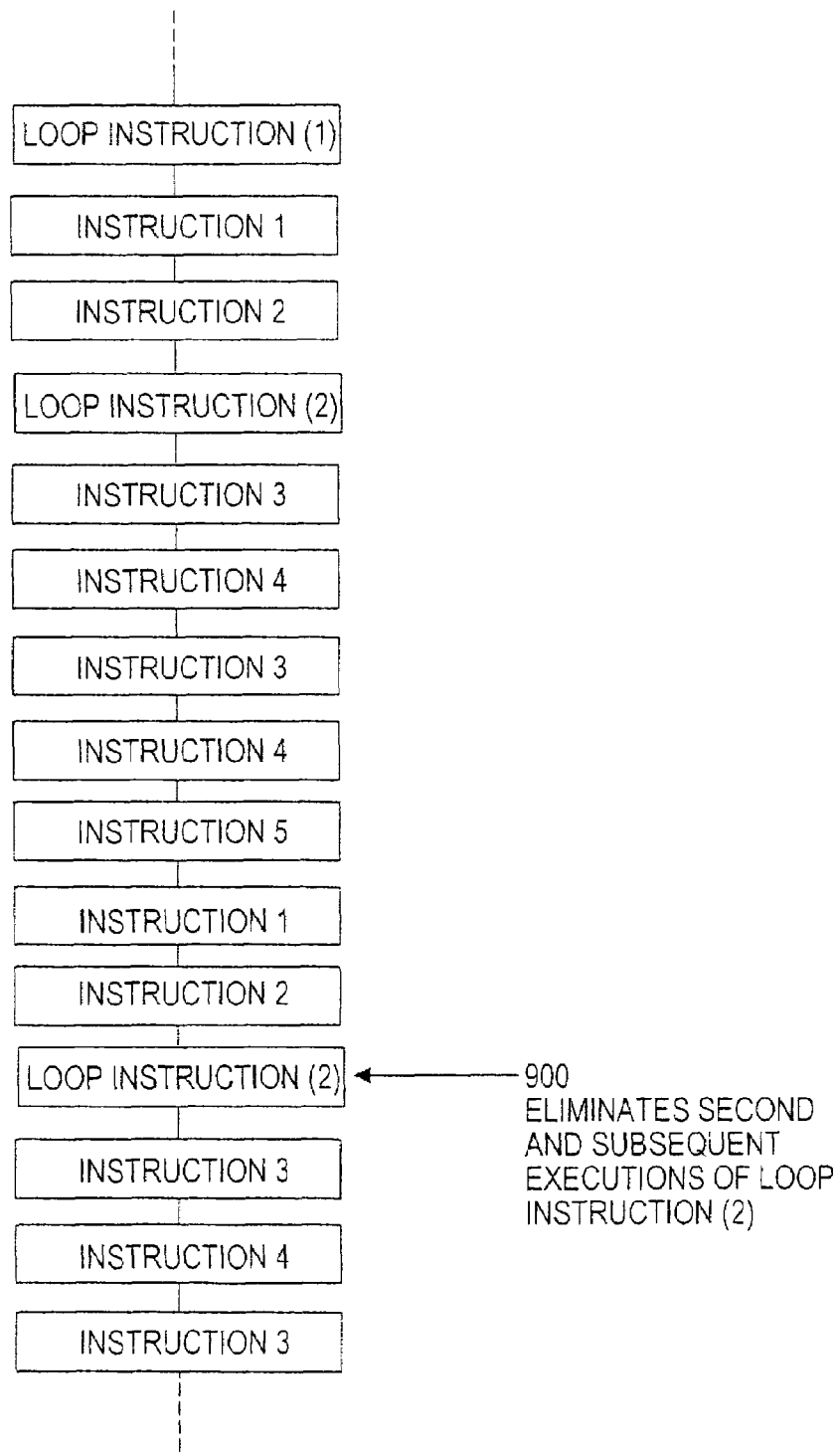
FIG. 11 shows part of the procedure of the processing executed in conjunction with program example 3 presented in flat transcription.

Subsequently, the processing in phases S2~S7 shown in FIG. 9 is executed as in the loop control method in the related art to output the program address for executing the next instruction before the loop control ends for the time being.

Through the operations described above, the recurring inner loop instruction is bypassed and the loop control circuit is allowed to engage in operation by using the values within the loop instruction register. Thus, the recurring loop instruction, i.e., the loop instruction occurring for the second time and subsequently, is not executed and, as a result, it is no longer necessary to allow for the time for processing the recurring loop instruction.

Next, the operations achieved in the first embodiment are explained in reference to program example 1 presented in FIG. 2. In the first embodiment, when executing the "loop instruction (1)" in the second row in program example 1, the address of instruction 1 is pushed down into the loop leading address stack 14, the value indicating the number of loop executions "100" is pushed down into the loop number stack 15 and the address of instruction 5 is pushed down into the loop trailing address stack 16. Then, the address of instruction 0 is stored at the storage location for the "address of the instruction immediately preceding the loop instruction" in the loop instruction register 17, the address of instruction 1 is stored at the storage location for the loop leading address in the loop instruction register 17, the value indicating the number of loop executions "100" is stored at the storage location for the loop number in the loop instruction register 17 and the address of instruction 5 is stored at the storage location for the loop trailing address in the loop instruction register 17.

When executing the "loop instruction (2)" in the fifth row, the address of instruction 3 is pushed down into the loop leading address stack 14 the value indicating the number of loop executions "2" is pushed down into the loop number stack 15, and the address of instruction 4 is pushed down into the loop trailing address stack 16. Then, the address of instruction 2 is stored (written over) at the storage location for the address of the instruction immediately preceding the loop instruction in the loop instruction register 17, the address of instruction 3 is stored (written over) at the storage location for the loop leading address in the loop instruction register 17, the value indicating the number of loop executions "2" is stored (written over) at the storage location for the loop number in the loop instruction register 17 and the address of instruction 4 is stored (written over) at the storage location for the loop trailing address in the loop instruction register 17.

Thus, the loop operation executed in response to the loop instruction (2) is completed, and next, instruction 5, 1 and 2 are executed through the operation control implemented in conformance to the loop instruction (1). During the execution of instruction 2, the address of the instruction immediately preceding the loop instruction in the loop instruction register 17 becomes equal to the PC value. At this point, the following four operations are concurrently executed.

Set the PC value at the PC 11 to a value for bypassing the loop instruction (the PC value is set to PC+2. This operation allows instruction 3 to be executed next).

Push down the loop leading address stored in the loop instruction register 17 into the loop leading address stack 14.

Push down the value indicating the number of loop executions stored in the loop instruction register 17 into the loop number stack 15.

Push down the loop trailing address stored in the loop instruction register 17 into the loop trailing address stack 16.

Subsequently, in phase S2 in FIG. 9, the PC value and the stack value at the loop trailing address stack 16 are compared with each other (phase S2). If the PC value is equal to the stack value at the loop trailing address stack 16, the PC value is set to the stack value at the loop leading*[1] address stack 16 in phase S3 (phase S3).

Next, in phase S4, "1" is subtracted from the stack value at the loop number stack 15 (phase S4). In phase S5, the stack value at the loop number stack 15 is compared with "0" (phase S5). If the stack value at the loop number stack 15 is 0, the loop leading address stack 14 is popped up, the loop number stack 15 is popped up and the loop trailing address stack 16 is popped up in phase S6 (phase S6).

If, on the other hand, the PC value is not equal to the stack value at the loop trailing address stack 16, "1" is added to the value at the program counter 11 (phase S7), before the loop control ends for the time being to allow the data processing to shift into the execution of the instruction at the next address.

Figure 3:
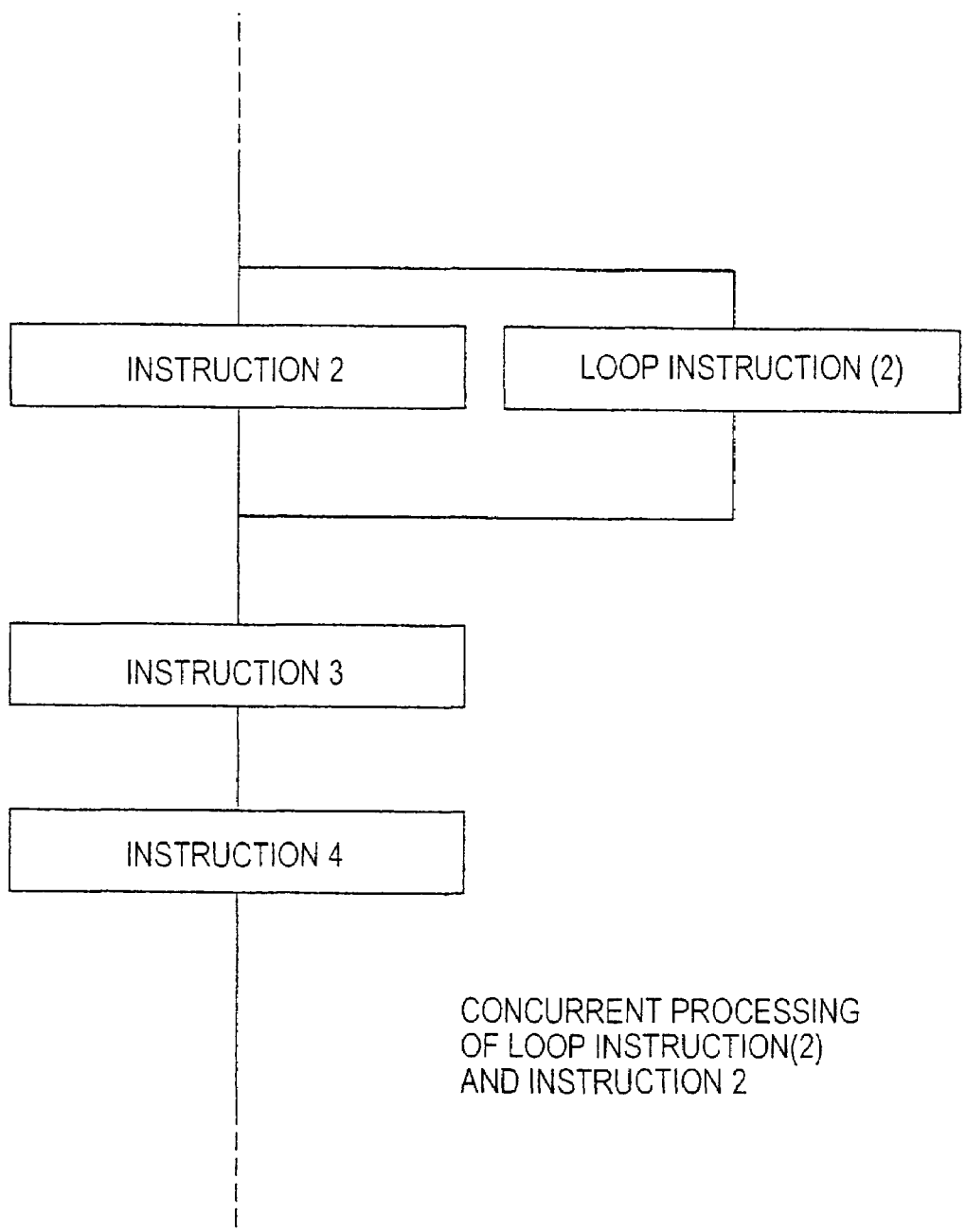
FIG. 3 shows part of the procedure of the processing implemented when program example 1 is executed in the first embodiment.

Through the operations described above, it becomes unnecessary to allow for the cycle time for the second and subsequent executions of the processing of the loop instruction (2), thereby achieving a reduction in overhead. FIG. 3 shows part of the procedure of the processing implemented in the first embodiment by executing program example 1 in FIG. 2. In the first embodiment, the loop instruction (2) and instruction 2 that are serially processed in the related art are concurrently processed as shown in FIG. 3.

(Second Embodiment)

Figure 4:
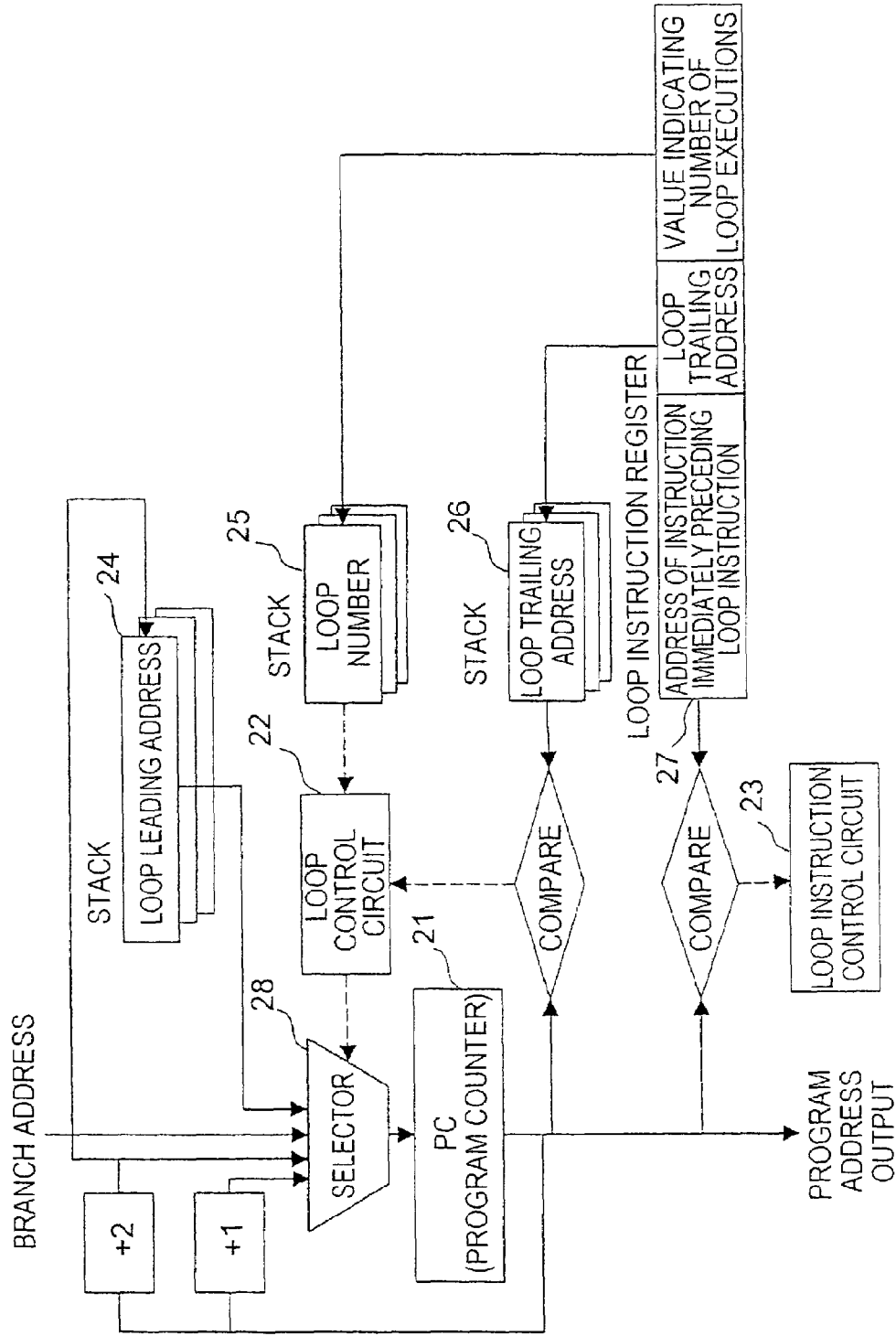
FIG. 4 is a block circuit diagram of the loop control circuit achieved in a second embodiment.

FIG. 4 is a block circuit diagram of the loop control circuit achieved in the second embodiment of the present invention. The loop control circuit in the second embodiment engages in operation as described below.

First, when executing a loop instruction, the "loop leading address" indicated in the loop instruction is pushed down into a "loop leading address" stack 24, the value indicating the number of loop executions is pushed down into a "loop number" stack 25 and the "loop trailing address" is pushed down into a "loop trailing address" stack 26.

Then, the "address of the instruction immediately preceding the loop instruction", the value indicating the number of loop executions and the loop trailing address are stored into their respective storage locations in a loop instruction register 27.

Next, a loop instruction control circuit 23 compares the address of the instruction immediately preceding the loop instruction stored in the loop instruction register 27 against a "PC value" at a PC 21, and if the values are equal to each other, the loop instruction control circuit 23 concurrently executes the following four operations.

Set the PC value to a value for bypassing the loop instruction (PC is set to PC+2 in the embodiment).

Designate the new PC value as the loop leading address and push it down into the loop leading address stack 24.

Push down the value indicating the number of loop executions stored in the loop instruction register 27 into the loop number stack 25.

Push down the loop trailing address stored in the loop instruction register 27 into the loop trailing address stack 26.

It is to be noted that the value which is added to the PC value to set it to a value for bypassing the loop instruction is determined in correspondence to the number of words in the loop instruction, e.g., +2 if there are two words and +3 if there are three words. 2 is added to the PC value in the embodiment.

Subsequently, the processing in phases S2~S7 shown in FIG. 9 is executed as in the loop control method in the related art to output the program address for executing the next instruction before the loop control ends for the time being.

Through the operations described above, the recurring inner loop instruction is bypassed and the loop control circuit is allowed to engage in operation by using the values within the loop instruction register. Thus, the recurring loop instruction, i.e., the loop instruction occurring for the second time and subsequently, is not executed and, as a result, it is no longer necessary to allow for the time for processing the recurring loop instruction.

The operations achieved in the second embodiment are identical to those achieved in the first embodiment except for that the "loop leading address" is calculated based upon the PC value in the second embodiment. In addition to the advantages achieved in the first embodiment, the second embodiment makes it possible to save on hardware resources since it eliminates the necessity for storing the loop leading address in the loop instruction register 27.

(Third Embodiment)

Figure 5:
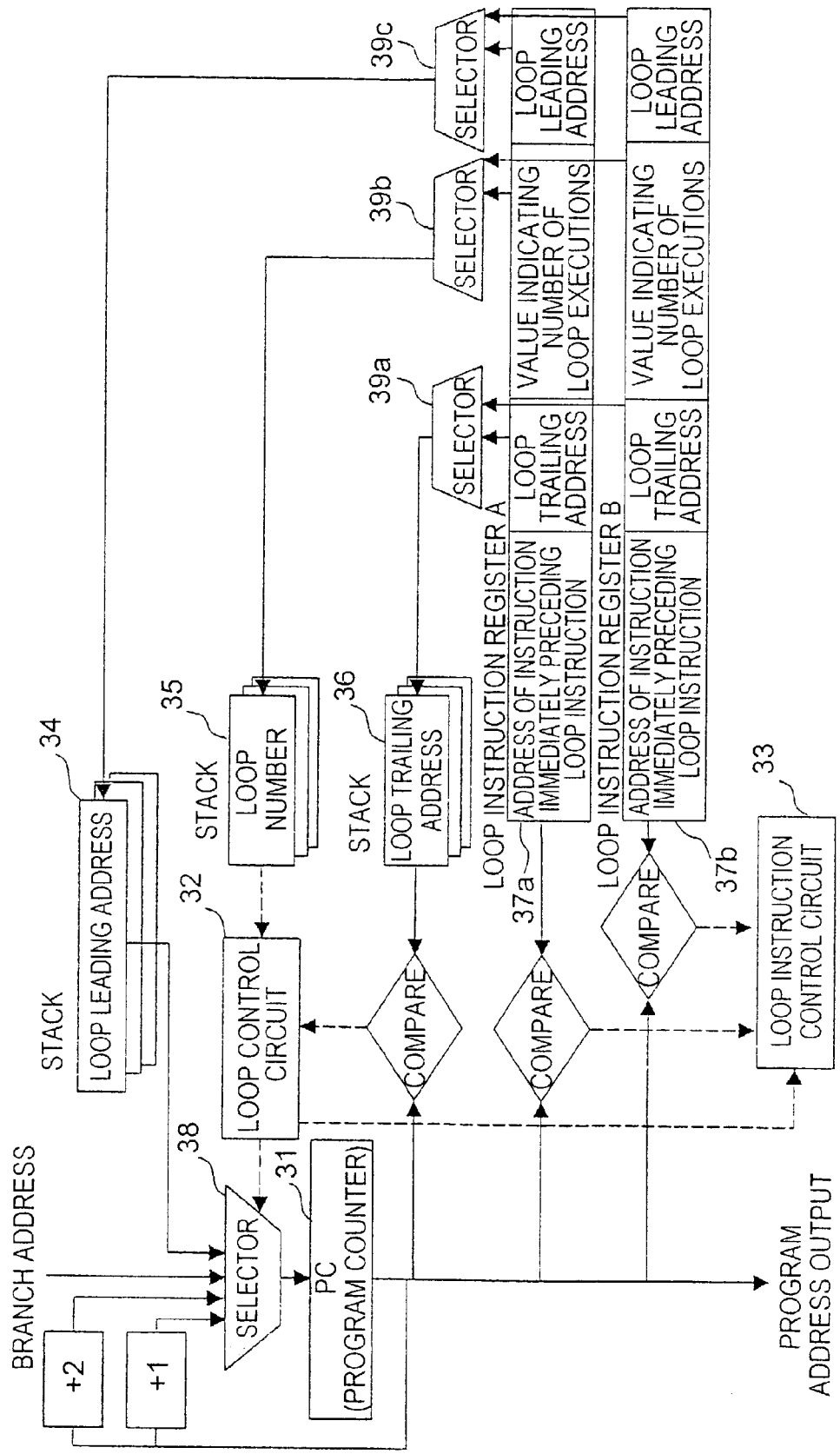
FIG. 5 is a block circuit diagram of the loop control circuit achieved in a third embodiment.

FIG. 5 is a block circuit diagram of the loop control circuit achieved in the third embodiment of the present invention. The loop control circuit in the third embodiment engages in operation as described below.

First, when executing a loop instruction, the "loop leading address" indicated in the loop instruction is pushed down into a "loop leading address" stack 34, the value indicating the number of loop executions is pushed down into the "loop number" stack 35 and the "loop trailing address" is pushed down into a "loop trailing address" stack 36.

Then, the "address of the instruction immediately preceding the loop instruction", the loop leading address, the value indicating the number of loop executions and the loop trailing address are stored at their respective storage locations in either of two loop instruction registers 37a and 37b where data were input first.

Next, a loop instruction control circuit 33 compares the addresses of the instructions each immediately preceding a loop instruction (2 addresses) stored in the loop instruction register A 37a and the loop instruction register B 37b with the PC value at a PC 31. If either of the addresses is equal to the PC value and, at the same time, the PC value at the PC 31 does not indicate a valid loop trailing address, the following four operations are concurrently executed. The explanation proceeds by assuming that the address of the instruction immediately preceding the loop instruction stored in the loop instruction register A 37a is equal to the PC value at the PC 31.

The "valid loop trailing address" in this context refers to the loop trailing address currently held in the loop control circuit. The same principle applies in the following explanation as well.

Set the PC value to a value for bypassing the loop instruction.

Push down the loop leading address stored in the loop instruction register A 37a into the loop leading address stack 34.

Push down the value indicating the number of loop executions stored in the loop instruction register A 37a, into the loop number stack 35.

Push down the loop trailing address stored in the loop instruction register A 37a into the loop trailing address stack 36.

It is to be noted that the value which is added to the PC value to set it to a value for bypassing the loop instruction is determined in correspondence to the number of words in the loop instruction, e.g., +2 if there are two words and +3 if there are three words. 2 is added to the PC value in the embodiment.

Subsequently, the processing in phases S2~S7 shown in FIG. 9 is executed as in the loop control method in the related art to output the program address for executing the next instruction before the loop control ends for the time being.

Through the operations described above, the recurring inner loop instruction is bypassed and the loop control circuit is allowed to engage in operation by using the values in the loop instruction register. Thus, the recurring loop instruction, i.e., the loop instruction occurring for the second time and subsequently, is not executed and, as a result, it is no longer necessary to allow for the time for processing the recurring loop instruction.

Next, the operations achieved in the third embodiment are explained in reference to program example 2 presented in FIG. 6. In the third embodiment, when executing the "loop instruction (1)" in the second row in program example 2, the address of instruction 1 is pushed down into the loop leading address stack 34, the value indicating the number of loop executions "100" is pushed down into the loop number stack 35 and the address of instruction 7 is pushed down into the loop trailing address stack 36. Then, the address of instruction 0 is stored at the storage location for the "address of the instruction immediately preceding the loop instruction" in the loop instruction register A 37a, the address of instruction 1 is stored at the storage location for the loop leading address in the loop instruction register A 37a, the value indicating the number of loop executions "100" is stored at the storage location for the loop number in the loop instruction register A 37a and the address of instruction 7 is stored at the storage location for the loop trailing address in the loop instruction register A 37a.

When executing the "loop instruction (2)" in the fifth row, the address of instruction 3 is pushed down into the loop leading address stack 34 the value indicating the number of loop executions "2" is pushed down into the loop number stack 35, and the address of instruction 4 is pushed down into the loop trailing address stack 36.

Then, the address of instruction 2 is stored at the storage location for the address of the instruction immediately preceding the loop instruction in the loop instruction register B 37b, the address of instruction 3 is stored at the storage location for the loop leading address in the loop instruction register B 37b, the value indicating the number of loop executions "2" is stored at the storage location for the loop number in the loop instruction register B 37b and the address of instruction 4 is stored at the storage location for the loop trailing address in the loop instruction register B 37b.

Subsequently, when executing the loop instruction (3) in the eighth row, the address of instruction 5 is pushed down into the loop leading address stack 34, the value indicating the number of loop executions "3" is pushed down into the loop number stack 35 and the address of instruction 6 is pushed down into the trailing address stack 36.

Then, the address of instruction 4 is stored (written over) at the storage location for the address of the instruction immediately preceding the loop instruction in the loop instruction register A 37a, the address of instruction 5 is stored (written over) at the storage location for the loop leading address in the loop instruction register A 37a, the value indicating the number of loop executions "3" is stored (written over) at the storage location for the loop number in the loop instruction register A 37a and the address of instruction 6 is stored (written over) at the storage location for the loop trailing address in the loop instruction register A 37a.

Thus, the loop operation executed in response to the loop instruction (3) is completed, and next, instruction 7, 1 and 2 are executed through the operation control implemented in conformance to the loop instruction (1). During the execution of instruction 2, the address of the instruction immediately preceding the loop instruction in the loop instruction register B 37b becomes equal to the PC value at the PC 31 which does not indicate a valid loop trailing address. At this point, the following four operations are concurrently executed.

Set the PC value at the PC 31 to a value for bypassing the loop instruction (the PC value is set to PC+2. This operation allows instruction 3 to be executed next).

Push down the loop leading address stored in the loop instruction register B 37b into the loop leading address stack 34.

Push down the value indicating the number of loop executions stored in the loop instruction register B 37b, into the loop number stack 35.

Push down the loop trailing address stored in the loop instruction register B 37b into the loop trailing address stack 36.

Through the operations described above, the information related to Loop 2 is stored into the loop control circuit and the operation in (i.e., a loop operation in which execution of instruction 3 and 4 is repeated twice) is executed by the loop control circuit.

Next, after the loop operation executed in conformance to the loop instruction (2) is completed, the address of the instruction immediately preceding the loop instruction stored in the loop instruction register A 37a becomes equal to the PC value while the PC value does not indicate a valid loop trailing address and, as a result, the following four operations are concurrently executed.

Set the PC value at the PC 31 to a value for bypassing the loop instruction (the PC value is set to PC+2. This operation allows instruction 5 to be executed next).

Push down the loop leading address stored in the loop instruction register A 37a into the loop leading address stack 34.

Push down the value indicating the number of loop executions stored in the loop instruction register A 37a, into the loop number stack 35.

Push down the loop trailing address stored in the loop instruction register A 37*a*, into the loop trailing address stack 36.

Through the four operations described above, the information related to Loop 3 is stored into the loop control circuit and the Loop 3 operation (i.e., a loop operation in which the execution of instruction 5 and 6 is repeated three times) is executed by the loop control circuit.

Subsequently, in phase S2 in FIG. 9, the PC value and the stack value at the loop trailing address stack 36 are compared with each other (phase S2). If the PC value is equal to the stack value at the loop trailing address stack 36, the PC value is designated as the stack value at the loop leading*[1] address stack 36 in phase S3 (phase S3).

Next, in phase S4, "1" is subtracted from the stack value at the loop number stack 35 (phase S4). In phase S5, the stack value at the loop number stack 35 is compared with "0" (phase S5). If the stack value at the loop number stack 35 is 0, the loop leading address stack 34 is popped up, the loop number stack 35 is popped up and the loop trailing address stack 36 is popped up in phase S6 (phase S6).

If, on the other hand, the PC value is not equal to the stack value at the loop trailing address stack 36, "1" is added to the value at the program counter 31 (phase S7), before the loop control ends for the time being to allow the data processing to shift into the execution of the instruction at the next address.

As described above, the loop instructions corresponding to Loop 2 and Loop 3 occurring for the second time and subsequently are not executed. Thus, it is no longer necessary to allow for the processing time for processing the recurring inner loop instructions (Loop 2 and Loop 3) present on the inside of the outer Loop 1.

While it is necessary to allow 1501 counts (cycles) to execute the instructions in Loop 1 in the loop control circuit in the related art, the same instructions can be executed over 1303 counts (cycles) in the third embodiment.

(Fourth Embodiment)

Figure 7:
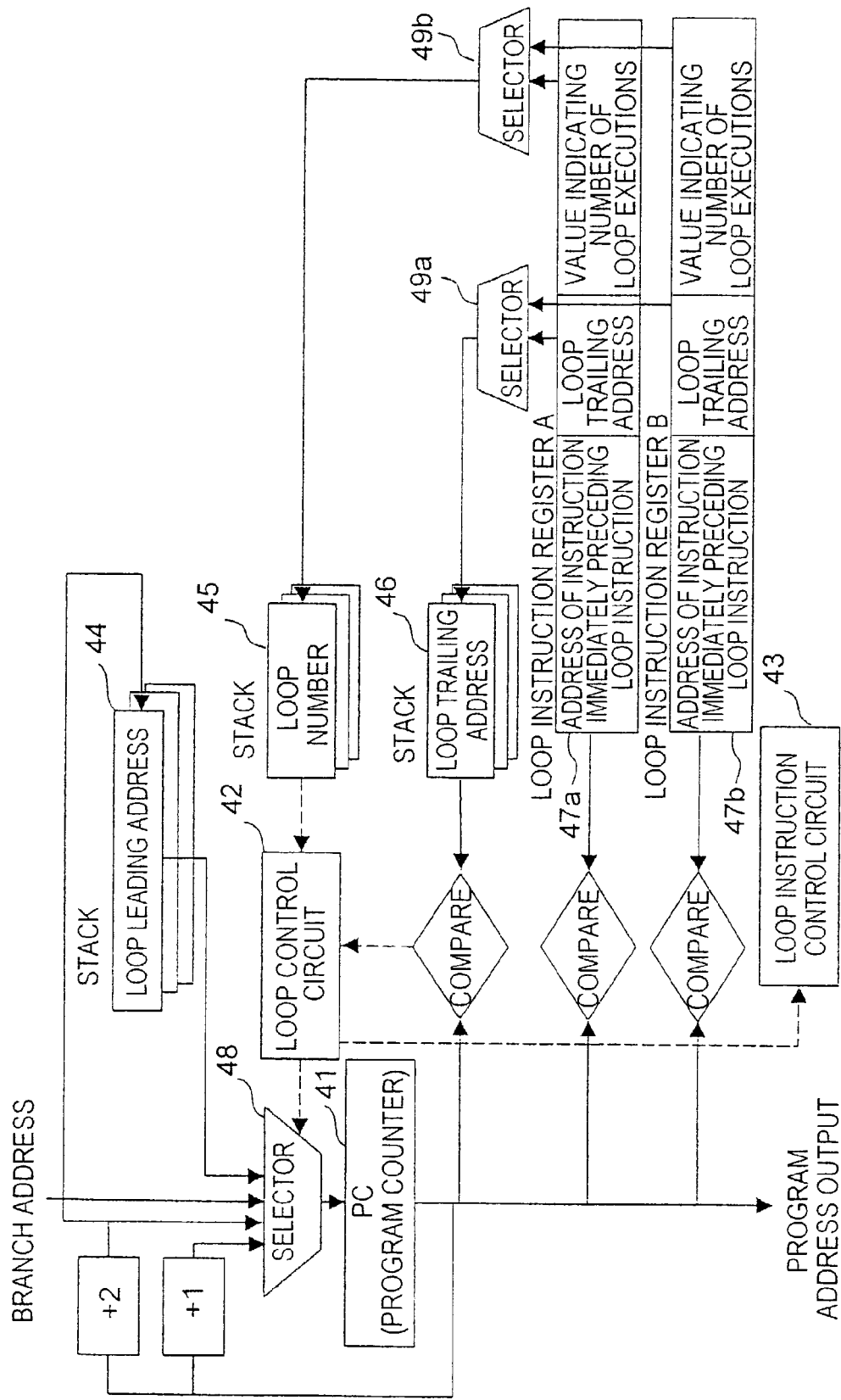
FIG. 7 is a block circuit diagram of the loop control circuit achieved in a fourth embodiment.
Figure 8:
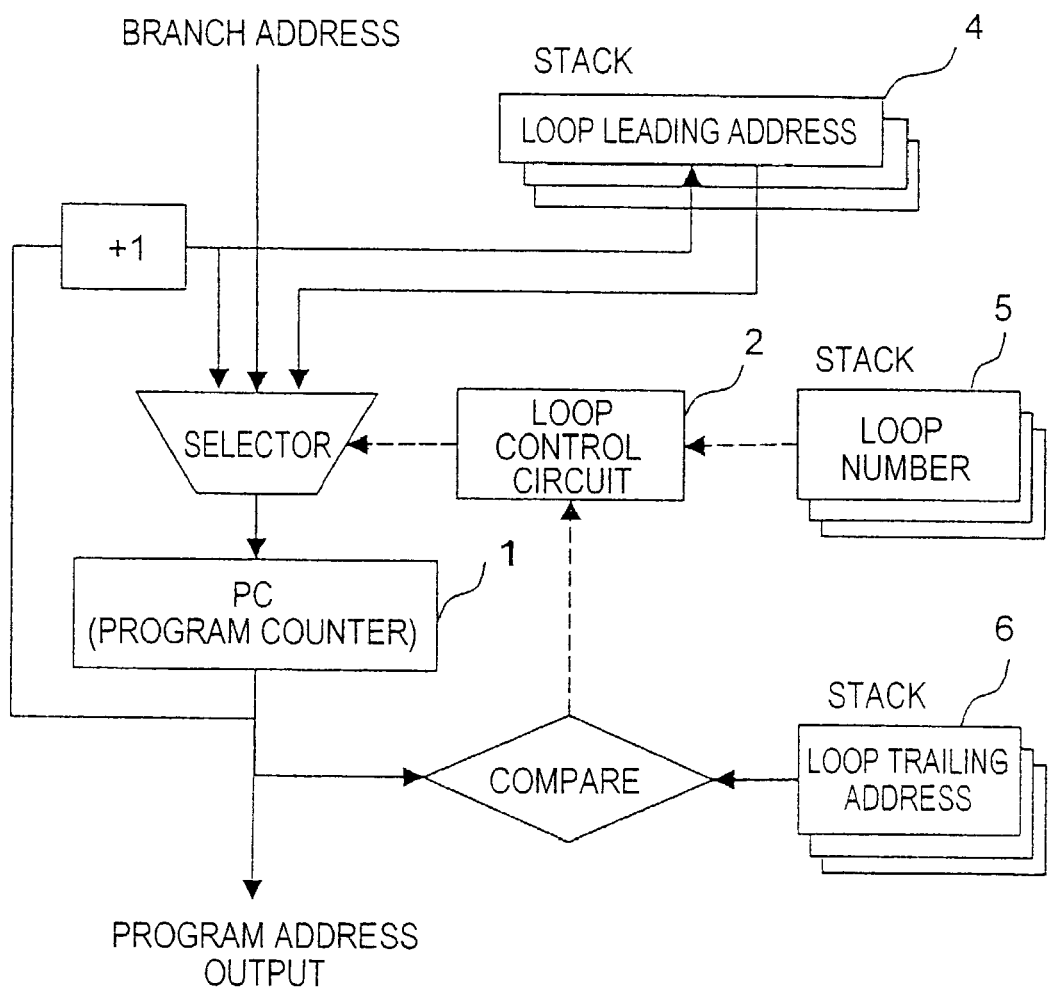
FIG. 8 is a block circuit diagram of a loop control circuit in the related art.

FIG. 7 is a block circuit diagram of the loop control circuit achieved in the fourth embodiment of the present invention. The loop control circuit in the fourth embodiment engages in operation as described below.

First, when executing a loop instruction, the "loop leading address" indicated in the loop instruction is pushed down into a "loop leading address" stack 44, the value indicating the number of loop executions is pushed down into a "loop number" stack 45 and the "loop trailing address" is pushed down into a "loop trailing address" stack 46.

Then, the address of the instruction immediately preceding the loop instruction, the value indicating the number of loop executions and the loop trailing address are stored at their respective storage locations in either of two loop instruction registers 47*a* and 47*b*, where data were input first.

Next, a loop instruction control circuit 43 compares the addresses of the instructions each immediately preceding the loop instruction (two addresses) stored in the loop instruction register A 47*a* and the loop instruction register B 47*b* with the PC value at a PC 41. If either of the addresses is equal to the PC value and, at the same time, the PC value at the PC 41 does not indicate a valid loop trailing address, the following four operations are concurrently executed. The explanation proceeds by assuming that the address of the instruction immediately preceding the loop instruction stored in the loop instruction register A 47*a* is equal to the PC value at the PC 41.

Set the PC value to a value for bypassing the loop instruction (PC is set to PC+2 in the embodiment).

Designate the new PC value as the loop leading address and push it down into the loop leading address stack 44.

Push down the value indicating the number of loop executions stored in the loop instruction register A 47*a* into the loop number stack 45.

Push down the loop trailing address stored in the loop instruction register A 47*a* into the loop trailing address stack 46.

It is to be noted that the value which is added to the PC value to set it to a value for bypassing the loop instruction is determined in correspondence to the number of words in the loop instruction, e.g., +2 if there are two words and +3 if there are three words. 2 is added to the PC value in the embodiment.

Subsequently, in phase S2 in FIG. 9, the PC value and the stack value at the loop trailing address stack 46 are compared with each other (phase S2). If the PC value is equal to the stack value at the loop trailing address stack 46, the PC value is designated as the stack value at the loop leading*[1] address stack 46 in phase S3 (phase S3).

Next, in phase S4, "1" is subtracted from the stack value at the loop number stack 45 (phase S4). In phase S5, the stack value at the loop number stack 45 is compared with "0" (phase S5). If the stack value at the loop number stack 45 is 0, the loop leading address stack 44 is popped up, the loop number stack 45 is popped up and the loop trailing address stack 46 is popped up in phase S6 (phase S6).

If, on the other hand, the PC value is not equal to the stack value at the loop trailing address stack 46, "1" is added to the value at the program counter 41 (phase S7), before the loop control ends for the time being to allow the data processing to shift into execution of the instruction at the next address.

Through the operations described above, the recurring inner loop instruction is bypassed and the loop control circuit is allowed to engage in operation by using the values in the loop instruction register. Thus, the recurring loop instruction, i.e., the loop instruction occurring for the second time and subsequently, is not executed and, as a result, it is no longer necessary to allow for the time for processing the recurring loop instruction.

The operations achieved in the fourth embodiment are identical to those achieved in the third embodiment except that the "loop leading address" is calculated based upon the PC value in the fourth embodiment. In addition to the advantages achieved in the third embodiment, the fourth embodiment makes it possible to save on hardware resources since it eliminates the necessity for storing the loop leading address in a loop instruction register.

It is to be noted that the loop control method according to the present invention has been described in detail in the explanation of the loop control circuit according to the present invention above.

While the invention has been particularly shown and described with respect to preferred embodiments of the loop control circuit and the loop control method according to the present invention by referring to the attached drawings, the present invention is not limited to these examples and it will be understood by those skilled in the art that various changes in form and detail may be made therein without departing from the spirit, scope and teaching of the invention. In addition, while the present invention is adopted in conjunction with duplex and triplex loop operations in the explanation provided in the specification, it goes without saying that the present invention may be adopted in loop operations executed in conformance to a greater number of loop instructions.

What is claimed is:

1. A loop control circuit comprising:
   a means for storage that pushes down a loop leading address, a value indicating the number of loop executions and a loop trailing address of a loop instruction being initially executed into a loop leading address stack, a loop number stack and a loop trailing address stack respectively, and stores the address of the instruction immediately preceding said loop instruction, the loop leading address, the value indicating the number of loop executions and the loop trailing address into a single loop instruction register into which data were input first among a plurality of loop instruction registers;
   a means for loop instruction recurrence prediction that predicts a recurrence of said loop instruction by comparing the addresses of the instructions each immediately preceding a loop instruction in said plurality of loop instruction registers and a valid loop trailing address with a program counter value; and
   a means for push down that adds the number of words constituting said loop instruction to the program counter value and also pushes down the loop leading address, the value indicating the number of loop executions and the loop trailing address stored in a loop instruction register having the address of the instruction immediately preceding said loop instruction which matches the program counter value into said loop leading address stack, said loop number stack and said loop trailing address stack respectively, when the address of the instruction immediately preceding the loop instruction stored in one of said plurality of loop instruction registers matches the program counter value and the valid loop trailing address does not match the program counter value and, accordingly, it is predicted that said loop instruction is to occur next.

2. A loop control circuit according to claim 1, wherein: the number of words constituting said loop instruction is at least two.

3. A loop control circuit comprising:
   a means for storage that pushes down a loop leading address, a value indicating the number of loop executions and the loop trailing address of a loop instruction being initially executed into a loop leading address stack, a loop number stack and a loop trailing address stack respectively, and stores the address of the instruction immediately preceding said loop instruction, the value indicating the number of loop executions and the loop trailing address into a single loop instruction register where the data were input first among a plurality of loop instruction registers;
   a means for loop instruction recurrence prediction that predicts a recurrence of said loop instruction by comparing the addresses of the instructions each immediately preceding a loop instruction stored in said plurality of loop instruction registers and a valid loop trailing address with a program counter value; and
   a means for push down that adds the number of words constituting said loop instruction to the program counter value, pushes down the new program counter value obtained by adding the number of words as the loop leading address into said loop leading address stack and also pushes down the value indicating the number of loop executions and the loop trailing address stored in a loop instruction register having the address of the instruction immediately preceding a loop instruction which matches the program counter value into said loop number stack and said loop trailing address stack respectively when the address of the instruction immediately preceding the loop instruction stored in one of said plurality of loop instruction registers matches the program counter value and the valid loop trailing address does not match the program counter value and, accordingly, it is predicted that said loop instruction is to occur next.

4. A loop control circuit according to claim 3, wherein: the number of words constituting said loop instruction is at least two.

5. A loop control method for predicting an occurrence of a loop instruction during execution by a processor, comprising the steps of:
   (a) pushing down a loop leading address, a value indicating the number of loop executions and a loop trailing address indicated in a loop instruction being initially executed into a loop leading address stack, a loop number stack and a loop trailing address stack respectively, and storing the address of the instruction immediately preceding said loop instruction, the loop leading address, the value indicating the number of loop executions and the loop trailing address into a single loop instruction register where the data were input first among a plurality of loop instruction registers;
   (b) predicting a recurrence of said loop instruction by comparing the addresses of the instructions each immediately preceding a loop instruction stored in said plurality of loop instruction registers and a valid loop trailing address with a program counter value;
   (c) adding the number of words constituting said loop instruction to the program counter value and the loop leading address; and
   (d) pushing down the value indicating the number of loop executions and the loop trailing address stored in a loop instruction register having the address of the instruction immediately preceding said loop instruction which matches the program counter value into said loop leading address stack, said loop number stack and said loop trailing address stack respectively when both a match of the address of the instruction immediately preceding the loop instruction stored in one of said plurality of loop instruction registers with the program counter value is detected and no match of the valid loop trailing address with the program counter value is detected, so that said loop instruction is predicted to occur next.

6. A loop control method according to claim 5, wherein: the number of words constituting said loop instruction is at least two.

7. A loop control method for predicting an occurrence of a loop instruction during execution by a processor, comprising the steps of:
   (a) pushing down a loop leading address, a value indicating the number of loop executions and a loop trailing address indicated in a loop instruction being initially executed into a loop leading address stack, a loop number stack and a loop trailing address stack respectively, and storing the address of the instruction immediately preceding said loop instruction, the value indicating the number of loop executions and the loop trailing address into a single loop instruction register where the data were input first among a plurality of loop instruction registers;

(b) predicting a recurrence of said loop instruction by comparing the addresses of the instructions each immediately preceding a loop instruction stored in said plurality of loop instruction registers and a valid loop trailing address with a program counter value;
(c) adding the number of words constituting said loop instruction to the program counter value;
(d) pushing down the new program counter value obtained by adding the number of words as the loop leading address into said loop leading address stack; and
(e) pushing down the value indicating the number of loop executions and the loop trailing address stored in a loop instruction register having the address of the instruction immediately preceding a loop instruction which matches the program counter value into said loop number stack and said loop trailing address stack respectively, when both a match of the address of the instruction immediately preceding the loop instruction stored in one of said plurality of loop instruction registers with the program counter value is detected and no match of the valid loop trailing address with the program counter value is predicted, so that said loop instruction is predicted to occur next.

8. A loop control method according to claim 7, wherein:
the number of words constituting said loop instruction is at least two.

* * * * *